United States Patent
Lyons et al.

(10) Patent No.: US 10,910,849 B2
(45) Date of Patent: Feb. 2, 2021

(54) CHARGING METHOD AND CHARGING SYSTEM

(71) Applicant: AVer Information Inc., New Taipei (TW)

(72) Inventors: Jay Paul Lyons, New Taipei (TW); Cheng-Che Hsieh, New Taipei (TW); Chi-Fa Hsu, New Taipei (TW); Chao-Hung Chang, New Taipei (TW); Lien-Kai Chou, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 362 days.

(21) Appl. No.: 15/965,971

(22) Filed: Apr. 29, 2018

(65) Prior Publication Data
US 2018/0316199 A1 Nov. 1, 2018

(30) Foreign Application Priority Data
May 1, 2017 (TW) .............................. 106114413 A

(51) Int. Cl.
 *H02J 7/00* (2006.01)
(52) U.S. Cl.
 CPC .......... *H02J 7/0024* (2013.01); *H02J 7/0026* (2013.01); *H02J 7/0027* (2013.01); *H02J 7/0068* (2013.01); *H02J 7/00718* (2020.01); *H02J 7/00304* (2020.01)
(58) Field of Classification Search
 CPC ....................................................... H02J 3/14
 USPC ............................................................ 307/29
 See application file for complete search history.

(56) References Cited

U.S. PATENT DOCUMENTS

| | | | |
|---|---|---|---|
| 8,935,011 B2 | 1/2015 | Tischer et al. | |
| 9,397,515 B2 | 7/2016 | Tischer | |
| 2004/0148060 A1* | 7/2004 | Lee ........................... | H02J 3/14 700/295 |
| 2012/0173033 A1* | 7/2012 | Tischer ................. | H02J 7/0047 700/295 |

FOREIGN PATENT DOCUMENTS

| | | |
|---|---|---|
| CN | 1641963 A | 7/2005 |
| CN | 103098572 A | 5/2013 |
| TW | 200413896 A | 8/2004 |

* cited by examiner

*Primary Examiner* — Edward Tso
*Assistant Examiner* — Ahmed H Omar
(74) *Attorney, Agent, or Firm* — CKC & Partners Co., LLC

(57) ABSTRACT

A charging method includes the following operations: charging an auxiliary power source and at least one charging power source simultaneously, in which a power demand of the auxiliary power source is a first consideration, and a power demand of the at least one charging power source is a second consideration; detecting an auxiliary current value of the auxiliary power source and a total charging current value of the at least one charging power source; and stopping charging the auxiliary power source when a sum of the auxiliary current value and the total charging current value is greater than a current threshold value.

16 Claims, 5 Drawing Sheets

CHARGING METHOD AND CHARGING SYSTEM

CROSS-REFERENCE TO RELATED APPLICATION

This application claims the priority benefit of TAIWAN Application serial no. 106114413, filed May 1, 2017, the full disclosure of which is incorporated herein by reference.

FIELD OF INVENTION

The invention relates to a charging method and a charging system. More particularly, the invention relates to a charging method and a charging system for allocating the power between the charging power source and the auxiliary power source.

BACKGROUND

A charging system is typically designed to accommodate several to several tens of digital devices and the charging system charges the devices simultaneously. Charging system includes input power source and output power source. The output power source is generally divided into charging power source and auxiliary power source. Both the charging power source and the auxiliary power source may simultaneously charge a plurality of digital devices. The power demand of the auxiliary power source is given priority, for example, providing the power source to the main device or the non-power-off device, etc., and the power demand of the charging power source is of secondary consideration, for example, providing the power source to secondary devices. In order to avoid overloading the power system while dozens of devices are charging simultaneously, the charging power is divided into several charging zones that allow the charging power source to be supplied to a single charging area only or to a number of charging zones simultaneously.

Since the output power source has an output power source limitation, it is necessary to allocate the power of the charging power source and the auxiliary power source. When allocating the power of the charging power source and the auxiliary power source, the power source is always insufficient to charge the digital devices if the power demand of the auxiliary power source is always given priority. If the upper power limitation which may be provided by the charging power source and auxiliary power source are set in advanced, although it may ensure that the charging power source may output enough power to charge the digital devices, but the power source capacity of the auxiliary power source is sacrificed, and the flexibility during use is reduced.

Therefore, how to ensure that the charging power source may charge the digital devices while maintaining the flexibility on the auxiliary power source, are the problems needed to be addressed in the art.

SUMMARY

An aspect of this disclosure is to provide a charging method. The charging method includes the following operations: charging an auxiliary power source and at least one charging power source simultaneously, in which a power demand of the auxiliary power source is a first consideration, and a power demand of the at least one charging power source is a second consideration; detecting an auxiliary current value of the auxiliary power source and the total charging current value of the at least one charging power source; and stopping charging the auxiliary power source when a sum of the auxiliary current value and the total charging current value is greater than a current threshold value.

Another aspect of this disclosure is to provide a charging system. The charging system includes an auxiliary current detecting device, a charging current detecting device and a controller. The auxiliary current detecting device is configured to detect an auxiliary current value when an auxiliary power source is under charging, wherein a power demand of the auxiliary power source is a first consideration. The charging current detecting device configured to detect a total charging current value when at least one charging power source is under charging, wherein a power demand of the at least one charging power source is a second consideration. The controller connected to the auxiliary current detecting device and the charging current detecting device, and the controller is configured to determine whether a sum of the auxiliary current value and the total charging current value is greater than a current threshold value or not, wherein if the sum of the auxiliary current value and the total charging current value is greater than the current threshold, the controller stops charging the auxiliary power source.

Therefore, according to the technical concept of the present disclosure, embodiments of this disclosure are to provide a charging method and a charging system, and in particular, a charging method and a charging system for allocating power between the charging power source and the auxiliary power source, so as to effectively allocate power between the charging power source and auxiliary power source to ensure that the charging power source may charge the digital devices while maintaining the flexibility of the auxiliary power source.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
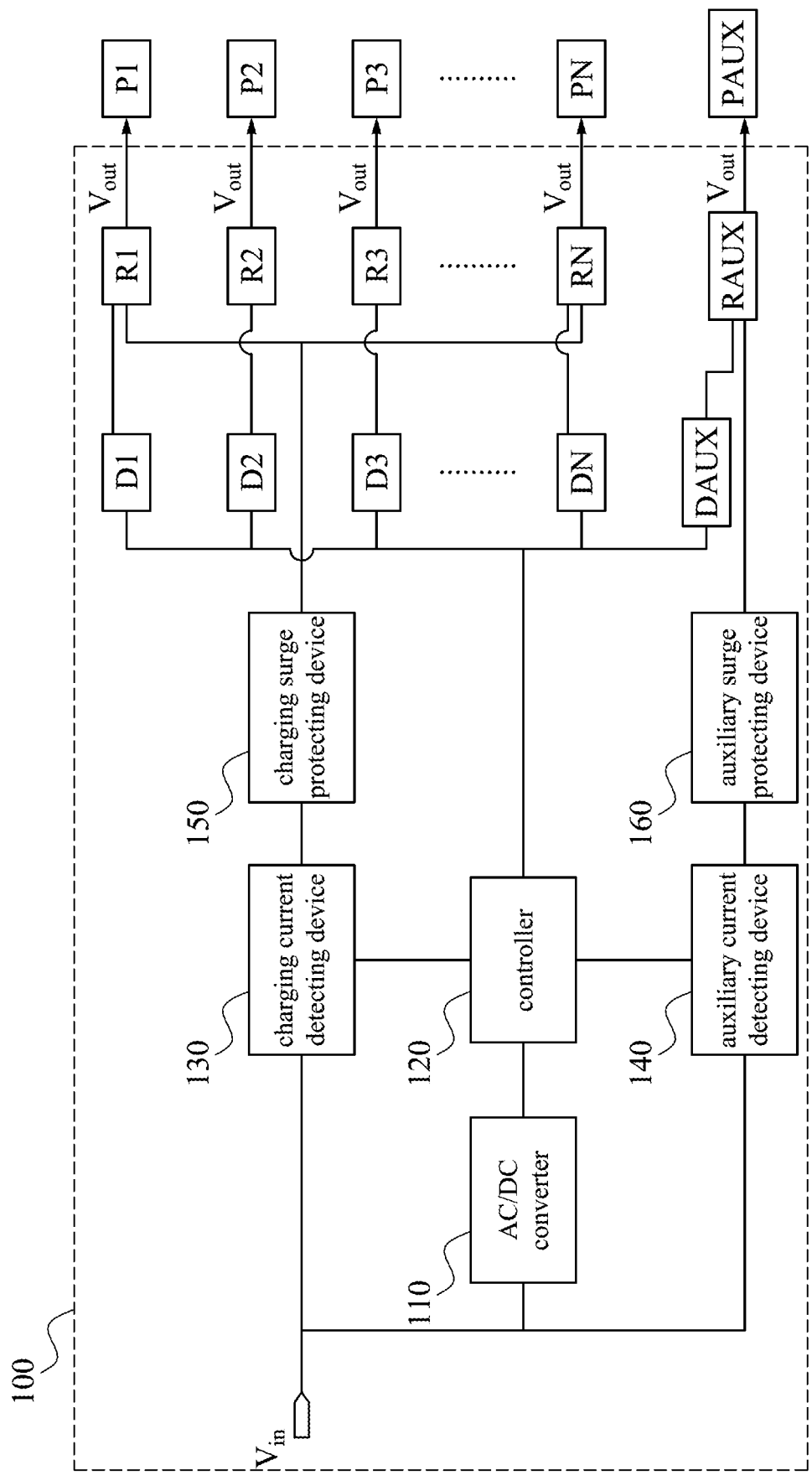
FIG. 1 is a schematic diagram illustrating a charging system according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

FIG. 1 is a schematic diagram of a charging system 100 according to some embodiments of the present disclosure. The charging system 100 includes a controller 120, a charging current detecting device 130, and an auxiliary current detecting device 140. As illustrated in FIG. 1, the charging system 100 may charge a plurality of charging power sources P1 to PN and/or an auxiliary power source PAUX. The charging system 100 illustrated in the first figure is for illustrative purposes only and the present disclosure is not limited thereto.

The auxiliary current detecting device 140 detects the auxiliary current value when the auxiliary power source PAUX is under charging. The charging current detecting device 130 detects the charging current value of the single charging power source P1 to PN or the total charging current value of the plurality of charging power sources P1 to PN. When detecting the single charging power source P1 to PN, the detected total charging current value is the charging current value of the single charging power source P1 to PN. The power demand of the auxiliary power source is the first consideration, and the power demand of the charging power source is the second consideration. In some embodiments of the present disclosure, the first consideration is a priority consideration, and the second consideration is a secondary consideration. For example, in some embodiments of the present disclosure, the charging system 100 may be used during teaching. The charging system 100 is capable of supplying power to the auxiliary power source PAUX and the charging power sources P1 to PN. The auxiliary power source PAUX and the charging power source P1 to PN may be used for connecting a digital device such as a notebook computer, a printer, an electronic whiteboard, a network router, and the like. The auxiliary power source PAUX is used by the instructor, and the charging power sourced P1 to PN are used by the students. Therefore, the power demand of the auxiliary power source PAUX is the priority consideration, and the power demand of the charging power source P1 to PN is the secondary consideration. The above mentioned is for illustrative purposes only and the present disclosure is not limited thereto.

The controller 120 is connected to the auxiliary current detecting device 140 and the charging current detecting device 130. The auxiliary current detecting device 140 and the charging current detecting device 130 transmit the detected current value to the controller 120. The controller 120 determines whether the sum of the auxiliary current value and the total charging current value is greater than the current threshold or not. If the controller 120 determines that the sum of the auxiliary current value and the total charging current value is greater than the current threshold, the controller 120 stops charging the auxiliary power source PAUX.

In the embodiments of the present disclosure, if the controller 120 determines that the sum of the auxiliary current value and the total charging current value is greater than the current threshold, the controller 120 first stops charging at least one of the charging power sources P1 to PN other than the main charging power source, and then stops charging the auxiliary power source PAUX. For example, if the charging system 100 charges the auxiliary power source PAUX, the charging power source P1, and the charging power source P2 simultaneously, and the charging power source P1 is the main charging power source. At this time, if the controller 120 determines that the sum of the auxiliary current value and the total charging current value is greater than the current threshold, the controller 120 stops charging the charging power source P2. After the controller 120 stops charging the charging power source P2, the controller 120 then stops charging the auxiliary power source PAUX if the controller 120 determines that the sum of the auxiliary current value and the total charging current value is still greater than the current threshold value. If the controller 120 determines that the sum of the auxiliary current value and the total charging current value is not greater than the current threshold, the controller 120 does not stop charging the auxiliary power source PAUX.

In some embodiments of the present disclosure, if the controller 120 determines that the sum of the auxiliary current value and the total charging current value is greater than the current threshold, the controller 120 first stops charging the charging power source P1 to PN other than the main charging power source, and then the controller 120 stops charging the auxiliary power source PAUX. For example, if the charging system 100 simultaneously charges the auxiliary power source PAUX, the charging power source P1, the charging power source P2, and the charging power source P3, and the charging power source P1 is the main charging power source. At this time, if the controller 120 determines that the sum of the auxiliary current value and the total charging current value is greater than the current threshold, the controller 120 stops charging the charging power source P2. After the controller 120 stops charging the charging power source P2, the controller 120 then stops charging the charging power source P3 if the controller 120 determines that the sum of the auxiliary current value and the total charging current value is still greater than the current threshold value. After the controller 120 stops charging the charging power source P2 and the charging power source P3, the controller 120 stops charging the auxiliary power source PAUX again if the controller 120 determines that the sum of the auxiliary current value and the total charging current value is still greater than the current threshold value.

In some embodiments of the present disclosure, when the controller 120 stops charging the auxiliary power source PAUX during charging, the controller 120 stores the auxiliary current value detected before stopping the charging of the auxiliary power source. If the controller 120 determines whether the sum of the auxiliary current value and the total charging current value is not greater than the current threshold during the charging process, the controller 120 restarts the charging of the auxiliary power source PAUX.

As illustrated in FIG. 1, in some embodiments of the present disclosure, the charging system 100 includes an auxiliary switching element RAUX and a charging switching element R1 to RN. The auxiliary switching element RAUX is turned on or off according to the auxiliary control signal transmitted by the controller 120 to start or stop charging the auxiliary power source PAUX. The charging switching elements R1 to RN are turned on or off according to the corresponding charging control signals transmitted by the controller 120 to start or stop charging the corresponding charging power sources P1 to PN.

As illustrated in FIG. 1, in some embodiments of the present disclosure, the charging system 100 includes an auxiliary power source driver D1 and a charging power source driver D1 to DN. The auxiliary power source driver D1 receives the auxiliary control signal and controls the auxiliary switching element RAUX according to the auxiliary control signal. The charging power source drivers D1 to DN are configured to receive the charging control signals in correspondence and control the charging switching elements R1 to RN in correspondence according to the charging control signals.

In some embodiments of the present disclosure, the controller 120 sets a charging schedule, the charging schedule comprises a plurality of charging combinations, each of which includes at least one of the charging power sources P1 to PN, and in the same combination, the sum of the total charging current value and the auxiliary current value is not greater than the current threshold. The controller 120 charges at least one of the auxiliary power source PAUX and the charging power sources P1 to PN according to the charging schedule.

In some embodiments of the present disclosure, when the controller 120 sets the charging schedule, the controller 120 subtracts the current threshold from the auxiliary current value to calculate the charging current threshold, and the charging power source included in each charging combination The total charging current value of at least one of P1 and PN is not greater than the charging current threshold. The above mentioned charge threshold is calculated as follows:

$$I\_CHRG\_LMT = I\_SYS\_LMT - I\_AUX\_SENSING.$$

I_CHRG_LMT is the charging current threshold, I_SYS_LMT is the current threshold, and I_AUX_SENSING is the auxiliary current value.

In the embodiment of the present disclosure, when the controller 120 sets the charging schedule, the controller 120 determines that one of the charging power sources P1 to PN is the main charging power source for the charging combination. For example, the controller 120 determines that the first charging combination includes at least the charging power source P1, and the charging power source P1 is the main charging power source of the first charging combination, and the remaining power sources P2 to PN are the secondary charging power sources, and pars of the secondary charging power is selected according to the charging current threshold to form the first combination. The controller 120 determines that the second charging combination includes at least the charging power source P2, and the charging power source P2 is the main charging power source of the second charging combination, and the remaining power sources P1, P3 to PN are the secondary charging power sources, and pars of the secondary charging power is selected according to the charging current threshold to form the second combination. The controller 120 determines that the third charging combination includes at least the charging power source P3, and the charging power source P3 is the main charging power source of the third charging combination, and the remaining power sources P1, P2, P4 to PN are the secondary charging power sources, and pars of the secondary charging power is selected according to the charging current threshold to form the third combination.

In some embodiments of the present disclosure, the controller 120 charges the auxiliary power source PAUX and/or the charging power sources P1 to PN according to the charging combination. In some embodiments of the present disclosure, a charging time is provided, that is, each charging combination may be charged until the charging time is reached. In addition, when each charging combination starts charging, the auxiliary power source PAUX will start charging simultaneously.

In some embodiments of the present disclosure, the charging system 100 further comprises an output device (not shown). When the auxiliary power source PAUX stops charging and/or the charging power sources P1 to PN stop charging, the output device outputs the reason and/or the state of the auxiliary power source PAUX and/or the charging power sources P1 to PN.

As illustrated in FIG. 1, in some embodiments of the present disclosure, the charging system 100 includes an AC/DC converter 110. The AC/DC converter 110 is used to convert the alternating current of the input power source into direct current and to transmit the direct current to the controller 120 to provide the power required by the controller 120.

As illustrated in FIG. 1, in some embodiments of the present disclosure, the charging system 100 further includes a charging surge protecting device 150 and an auxiliary surge protecting device 160 to reduce the impact of the surge current on the circuit.

Figure 2:
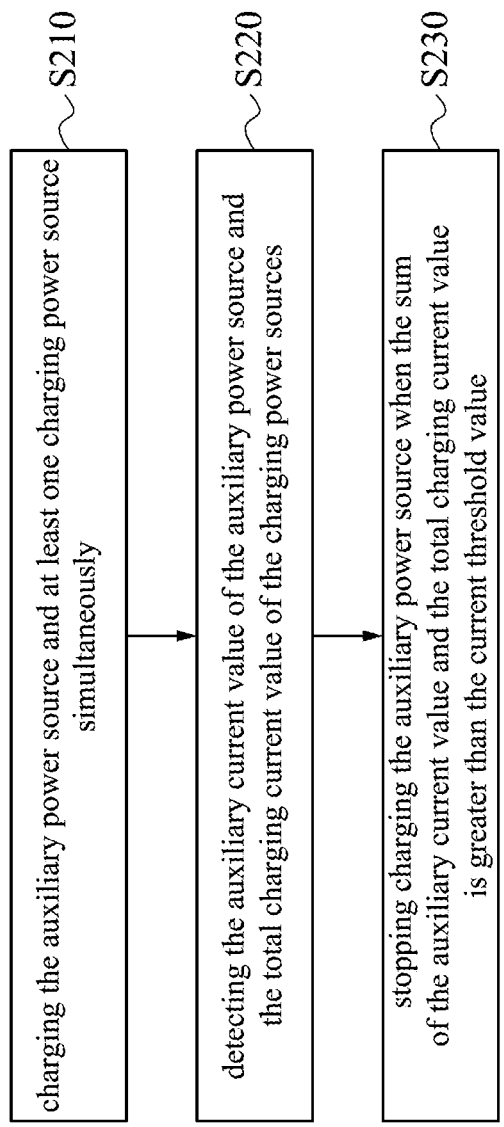
FIG. 2 is a flow chart illustrating a charging method according to some embodiments of the present disclosure.

FIG. 2 is a flow chart of a charging method 200 according to some embodiments of the present disclosure. As shown in FIG. 2, the charging method 200 includes the following operations:

S210: charging the auxiliary power source and at least one charging power source simultaneously;

S220: detecting the auxiliary current value of the auxiliary power source and the total charging current value of the charging power sources; and S230: stopping charging the auxiliary power source when the sum of the auxiliary current value and the total charging current value is greater than the current threshold value.

For the purpose of making the charging method 200 of the present embodiment easy to understand, reference is made to FIG. 1 and FIG. 2 together.

In operation S210, charging the auxiliary power source and at least one charging power source simultaneously. For example, the auxiliary power source PAUX, the charging power source P1, and the charging power source P2 may be charged by the charging system 100 simultaneously.

In operation S220, detecting the auxiliary current value of the auxiliary power source and the total charging current value of the charging power sources. In some embodiments of the present disclosure, operation S220 may be performed by the charging current detecting device 130 and the auxiliary current detecting device 140.

In operation S230, stopping charging the auxiliary power source when the sum of the auxiliary current value and the total charging current value is greater than the current threshold value. In some embodiments of the present disclosure, operation S230 may send an auxiliary control signal to the auxiliary power source driver DAUX by the controller 120 and turn off the auxiliary power source PAUX according to the auxiliary control signal.

Figure 3A:
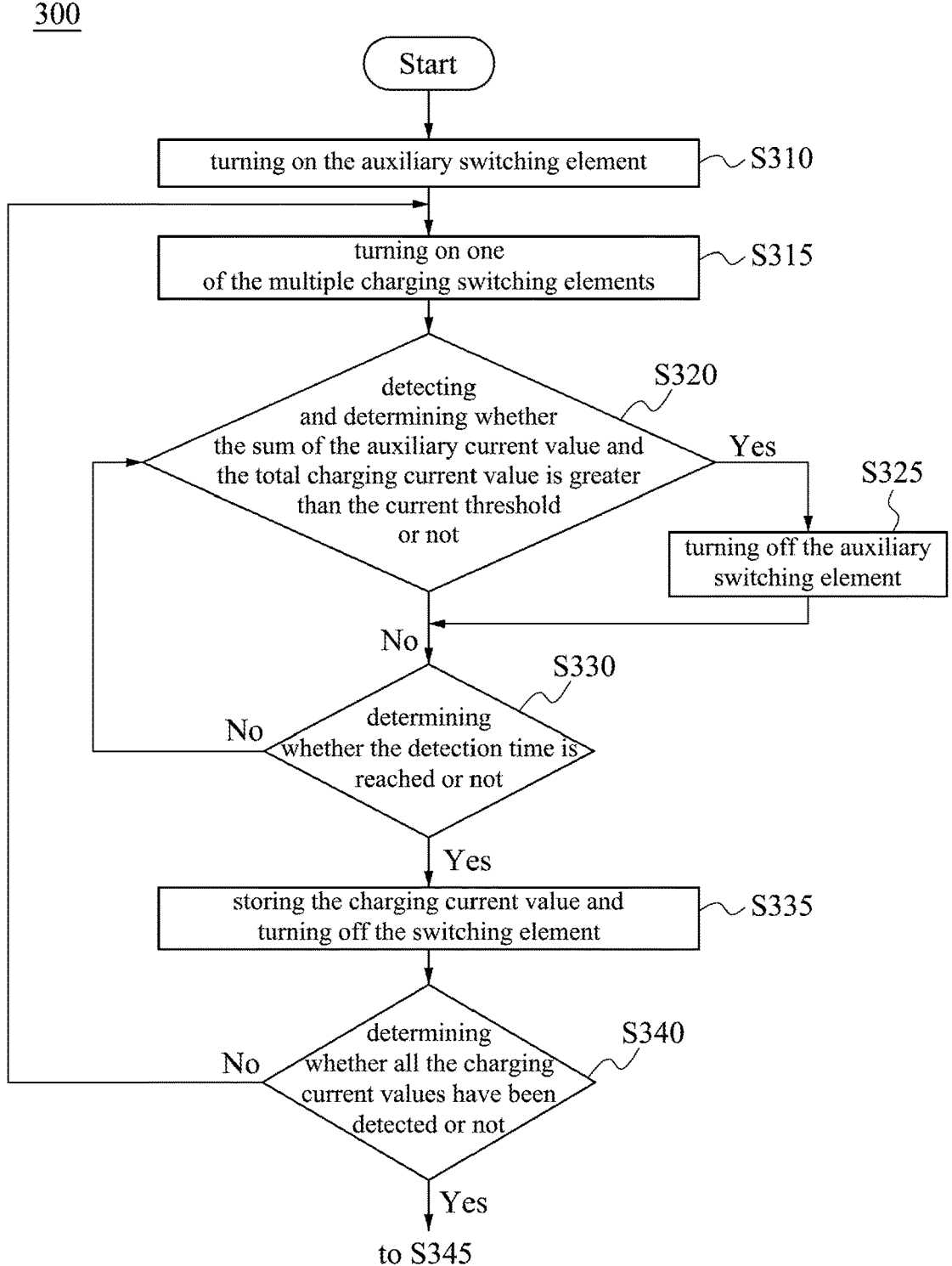
FIG. 3A is a flow chart illustrating part of another charging method according to some embodiments of the present disclosure.
Figure 3B:
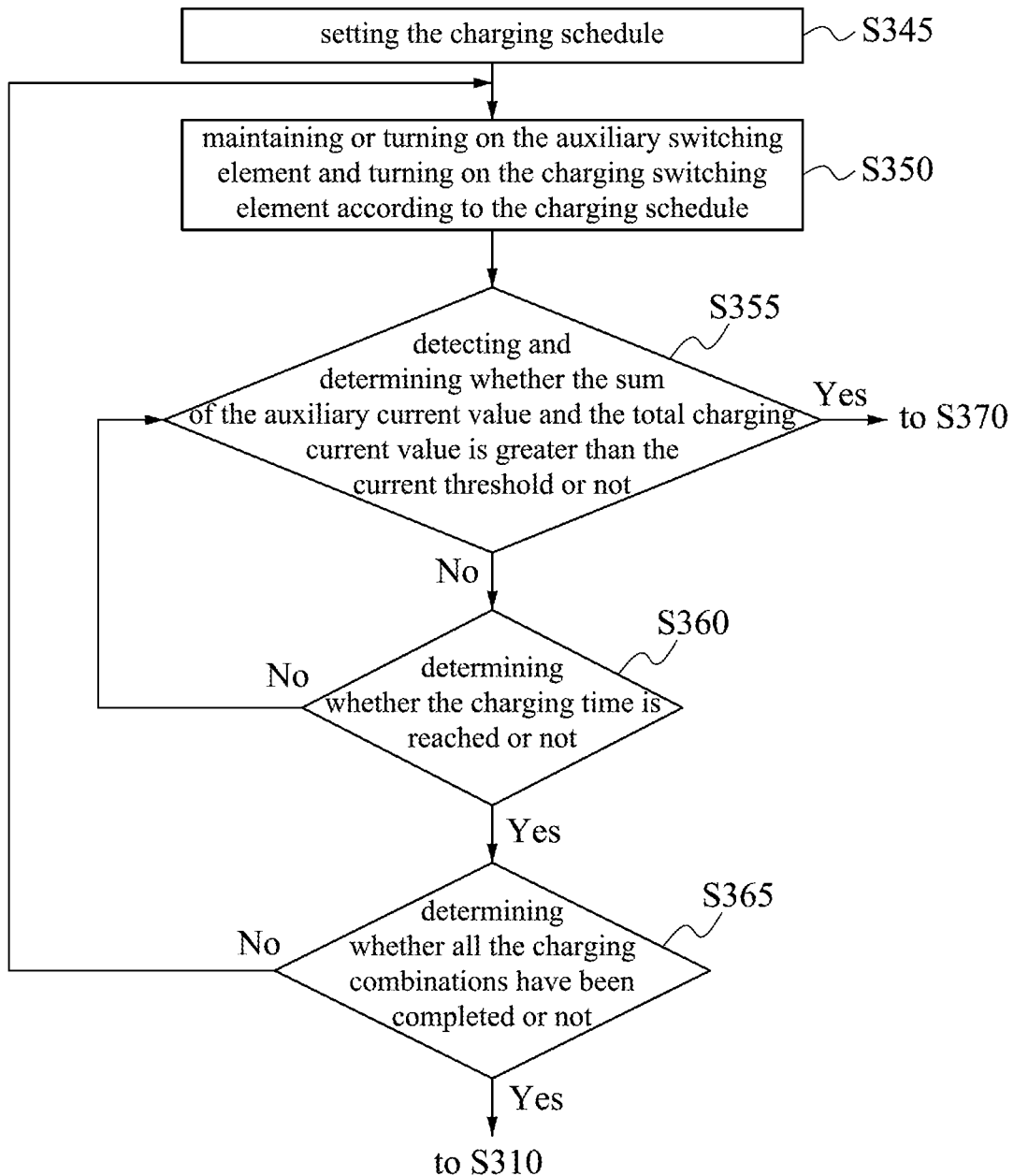
FIG. 3B is a flow chart illustrating part of another charging method according to some embodiments of the present disclosure.
Figure 3C:
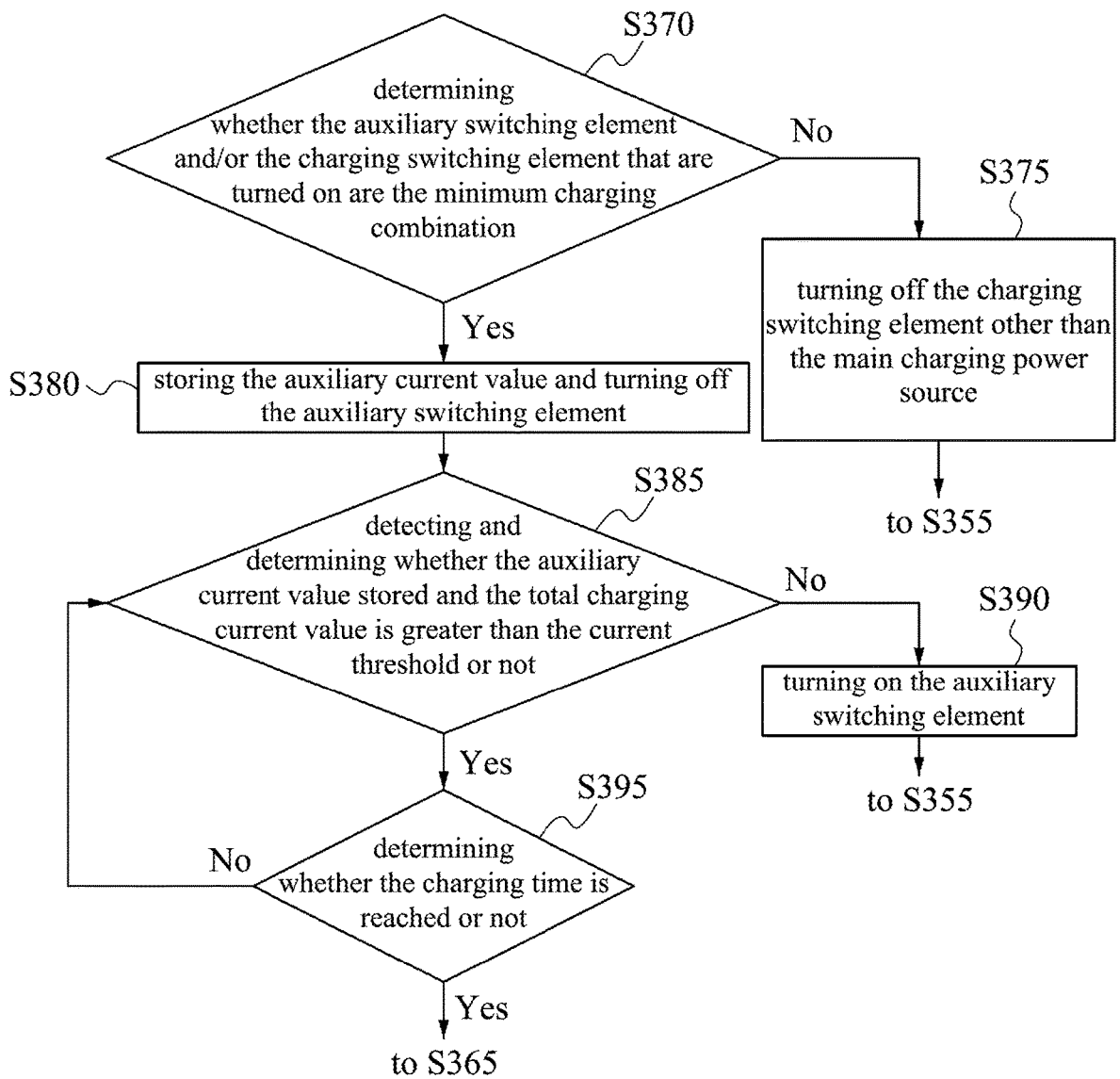
FIG. 3C is a flow chart illustrating part of another charging method according to some embodiments of the present disclosure.

FIG. 3A is a flow chart illustrating part of another charging method 300 according to some embodiments of the present disclosure. FIG. 3B is a flow chart illustrating part of another charging method 300 according to some embodiments of the present disclosure. FIG. 3C is a flow chart illustrating part of another charging method 300 according to some embodiments of the present disclosure. As shown in FIG. 3A, the charging method 300 includes the following operations:

S310: turning on the auxiliary switching element;

S315: turning on one of the multiple charging switching elements;

S320: detecting and determining whether the sum of the auxiliary current value and the total charging current value is greater than the current threshold or not;

S325: turning off the auxiliary switching element;

S330: determining whether the detection time is reached or not;

S335: storing the charging current value and turning off the switching element; and S340: determining whether all the charging current values have been detected or not.

As shown in FIG. 3B, the charging method 300 further includes the following operations:

S345: setting the charging schedule;

S350: maintaining or turning on the auxiliary switching element and turning on the charging switching element according to the charging schedule;

S355: detecting and determining whether the sum of the auxiliary current value and the total charging current value is greater than the current threshold or not;

S360: determining whether the charging time is reached or not; and

S365: determining whether all the charging combinations have been completed or not.

As shown in FIG. 3C, the charging method 300 includes the following operations:

S370: determining whether the auxiliary switching element and/or the charging switching element that are turned on are the minimum charging combination;

S375: turning off the charging switching element other than the main charging power source;

S380: storing the auxiliary current value and turning off the auxiliary switching element;

S385: detecting and determining whether the auxiliary current value stored and the total charging current value is greater than the current threshold or not;

S390: turning on the auxiliary switching element; and

S395: determining whether the charging time is reached or not.

For the purpose of making the charging method 300 of the present embodiment easy to understand, reference is made to FIGS. 1, and 3A to 3C.

First, reference is made to FIG. 3A. In operation S310, turning on the auxiliary switching element. In some embodiments of the present disclosure, operation S310 may be performed by the controller 120 through the auxiliary power source driver DAUX. The auxiliary switching element RAUX is turned on to charge the auxiliary power source PAUX.

In operation S315, turning on one of the multiple charging switching elements. In some embodiments of the present disclosure, operation S315 may be performed by the controller 120 through the charging power drivers D1 to DN. The charging switching elements R1 to RN may be turned on to charge the corresponding charging power sources P1 to PN.

In operation S320, detecting and determining whether the sum of the auxiliary current value and the total charging current value is greater than the current threshold or not. In operation S320, the detection of the auxiliary current value and the total charging current value are the same as those of the above-mentioned operation S220, and will not be repeated here. In some embodiments of the present disclosure, the determination of whether the sum of the auxiliary current value and the total charging current value is greater than the current threshold or not in operation S320 may be executed by the controller 120.

As shown in FIG. 3A, if the determination result of operation S320 is that the sum of the auxiliary current value and the total charging current value is greater than the current threshold value, operation S325 is performed. If the determination result of operation S320 is that the sum of the auxiliary current value and the total charging current value is not greater than the current threshold value, operation S330 is performed.

In operation S325, turning off the auxiliary switching element. In some embodiments of the present disclosure, operation S325 may be performed by the controller 120 through the auxiliary power source driver DAUX. The auxiliary power source PAUX may be stopped charging by turning off the auxiliary switching element RAUX.

In operation S330, determining whether the detection time is reached or not. In some embodiments of the present case, operation S330 may be performed by the controller 120. As shown in FIG. 3A, if the determination result in operation S330 is to reach the detection time, operation S335 is performed. If the determination result at operation S330 is that the detection time is not reached, operation S320 is performed to continue to detect and determine whether the sum of the auxiliary current value and the total charging current value is greater than the current threshold.

In operation S335, storing the charging current value and turning off the switching element. For example, if the charging switching element R1 is turned on in operation S315 and it is determined that the detection time has been reached at operation S330, in operation S335, the controller 120 stores the charging current value transmitted by the charging current detecting device 130 at that time to be a charging current value corresponding to the charging power source P1, and the controller 120 stops charging the charging power source P1.

In operation S340, determining whether all the charging current values have been detected or not. In some embodiments of the present disclosure, operation S340 is performed by the controller 120. In some embodiments of the present disclosure. If it is determined in operation S340 that all the charging current values have been detected, operation S345 is performed. If it is determined in operation S340 that all the charging current values have not been detected, operation S315 is performed to turn on the other of the charging switching elements R1 to RN to detect the charging current value.

In some embodiments of the present disclosure, if the auxiliary switching element RAUX is turned off at operation S325, the auxiliary switching element RAUX is not turned on when the charging current value of the remaining charging power sources P1 to PN is detected. For example, if the auxiliary switching element RAUX is turned off when the charging current value of the charging power source P1 is detected, the auxiliary switching element RAUX is not turned on when the remaining charging current values of the remaining charging power sources P2 to PN are detected.

Reference is made to FIG. 3B, in operation S345, setting the charging schedule. In some embodiments of the present case, operation S345 is performed by the controller 120. In some embodiments of the present disclosure, the charging schedule includes a plurality of charging combinations, each of the charging combinations includes at least one of the charging power sources P1 to PN, and the sum of the total charging current value and the auxiliary current value in the same combination is not greater than the current threshold. The controller 120 charges at least one of the auxiliary power source PAUX and the charging power sources P1 to PN according to the charging schedule.

In some embodiments of the present disclosure, when the charging schedule is set, the current threshold is subtracted from the auxiliary current value to calculate the charging current threshold, and the total charging current value of at least the charging power source P1 to PN included in each charging combination is not greater than the charging current threshold. The above charging current threshold is calculated as follows:

$$I\_CHRG\_LMT = I\_SYS\_LMT - I\_AUX\_SENSING.$$

I_CHRG_LMT is the charging current threshold, I_SYS_LMT is the current threshold, and I_AUX_SENSING is the auxiliary current value.

In some embodiments of the present disclosure, when the charging schedule is set, it is determined that one of the charging power sources P1 to PN is the main charging power source of the charging combination. For example, it is first determined that the charging power source P1 is the main charging power source of the first charging combination, the charging power source P2 is the main charging power source of the second charging combination, and the charging power source P3 is the main charging power source of the third charging combination.

For example, it is assumed that the current values in the charging system 100 are shown in Table 1 and the current threshold is 12 amperes:

TABLE 1

| charging system100 | | current value(amperes) |
|---|---|---|
| charging power source | P1 | 11 |
|  | P2 | 6 |
|  | P3 | 5 |
|  | P4 | 4 |
| auxiliary power source | PAUX | 1 |

When setting the charging schedule, the current threshold is subtracted from the auxiliary current value to calculate the charging current threshold of 11 amperes. Next, it is determined that the first charging combination includes the charging power source P1 and the charging power source P1 is the main charging power source of the first charging combination; it is determined that the second charging combination includes the charging power source P2 and the charging power source P2 is the main charging power source of the second charging combination; it is determined that the third charging combination includes the charging power source P3 and the charging power source P3 is the main charging power source of the third charging combination; and it is determined that the fourth charging combination includes the charging power source P4 and the charging power source P4 is the main charging power source of the fourth charging combination. In addition, other charging power sources are added to each charging combination, and the total charging current value of at least one of the charging power sources P1 to PN included in each charging combination is not larger than the charging current threshold. The main charging power source according to one of the charging combinations set according to Table 1 and each charging combination is shown in Table 2, but the present disclosure is not limited to this:

TABLE 2

| charging schedule | charging power source | main charging power source |
|---|---|---|
| first charging combination | charging power sourceP1 | charging power sourceP1 |
| second charging combination | charging power sourceP2 and charging power sourceP3 | charging power sourceP2 |
| third charging combination | charging power sourceP3 and charging power sourceP2 | charging power sourceP3 |
| fourth charging combination | charging power sourceP4 and charging power sourceP2 | charging power sourceP4 |

The total charging current value in the first charging combination, the second charging combination, and the third charging combination in Table 2 are all 11 amps, and the total charging current in the fourth charging combination is 10 amps. That is, the total charging current value of the charging power source included in each charging combination is not greater than the charging current threshold.

In operation S350, maintaining or turning on the auxiliary switching element and turning on the charging switching element according to the charging schedule. If the auxiliary switching element RAUX is turned on when the operation S350 is executed, the switching element RAUX is remained to be turned on. If the auxiliary switching element RAUX is turned off when the operation S350 is executed, the switching element RAUX is turned on. That is, when charging is started for each charging combination, the auxiliary power source PAUX is started to be charged simultaneously.

In operation S355, detecting and determining whether the sum of the auxiliary current value and the total charging current value is greater than the current threshold or not. In some embodiments of the present disclosure, operation S355 is performed by the controller 120. As shown in FIG. 3B, if the determination result of operation S355 is that the sum of the auxiliary current value and the total charging current value is greater than the current threshold value, operation S370 is performed. If the determination result of operation S355 is that the sum of the auxiliary current value and the total charging current value is not greater than the current threshold value, operation S360 is performed.

In operation S360, determining whether the charging time is reached or not. In some embodiments of the present disclosure, operation S360 is performed by the controller 120. As shown in FIG. 3B, if the determination result in operation S360 is the charging time is reached, operation S365 is performed. If the determination result at operation S360 is that the charging time is not reached, the process returns to operation S355 to continue detecting and determining whether the sum of the auxiliary current value and the total charging current value is greater than the current threshold.

In operation S365, determining whether all the charging combinations have been completed or not. In some embodiments of the present disclosure, operation S365 is performed by the controller 120. As shown in FIG. 3B, if the determination result of operation S365 is that all the charging combinations have been completed, the process returns to operation S310 to detect the charging current value of each of the charging power sources P1 to PN. If the determination result of operation S365 is that not all the charging combinations are completed, the process returns to operation S350 to charge the auxiliary power source PAUX and/or the charging power source P1 to PN according to the remaining charging combinations.

For example, if the current threshold is 12 amperes, the current values are as shown in Table 1, and the charging combination is as shown in Table 2. In operation S350, according to the first charging combination in Table 2, the auxiliary power source PAUX and the charging power source P1 are under charging. If the determination result in operation S355 is that the sum of the auxiliary current value and the total charging current value is greater than the current threshold value, the determination result of operation S360 is the charging time is reached, and if the determination result in operation S365 is that not all the charging combinations are completed, return to operation S350 to charge the auxiliary power source PAUX, the charging power source P2, and the charging power source P3 according to the second charging combination.

If it is determined in operation S355 that the sum of the auxiliary current value and the total charging current value is greater than the current threshold value, operation S370 is performed. Reference is made to FIG. 3C, in operation S370, determining whether the auxiliary switching element and/or the charging switching element that are turned on are the minimum charging combination. The above mentioned minimum charging combination may be one of the main charging power source, the main charging power source and the remaining charging power source, the main charging power source, and the remaining charging power source. The minimum charging combination described above is for illustrative purposes only and the present disclosure is not limited thereto. As shown in FIG. 3C, if operation S370 determines that the auxiliary switching element and/or the charging switching element that are turned on are the minimum charging combination, operation S380 is performed. If it is determined at operation S370 that the auxiliary switching element and/or the charging switching element that are turned on are not the minimum charging combination, operation S375 is performed.

In operation S375, turning off the charging switching element other than the main charging power source. In some embodiments of the present disclosure, the charging current in the charging power source other than the main charging power source is turned off at operation S375. In some embodiments of the present disclosure, any one of the charging power sources other than the main charging power source is turned off in operation S375. The above is for illustrative purposes only and the present disclosure is not limited thereto.

In operation S380, storing the auxiliary current value and turning off the auxiliary switching element. In some embodiments of the present disclosure, operation S380 is performed by the controller 120 and the auxiliary current value is detected by the auxiliary current detecting device 140 and transmitted to the controller 120.

In operation S385, detecting and determining whether the auxiliary current value which is stored and the total charging current value is greater than the current threshold or not. As shown in FIG. 3C, if the determination result of operation S385 is that the sum of the stored auxiliary current value and the total charging current value is greater than the current threshold value, operation S395 is performed. If the determination result of operation S385 is that the sum of the auxiliary current value which is stored and the total charging current value is not greater than the current threshold value, operation S390 is performed.

In operation S390, turning on the auxiliary switching element. The detailed embodiment of operation S390 is the same as that of operation S310, and the description thereof will not be repeated here.

In operation S395, determining whether the charging time is reached or not. In some embodiments of the present disclosure, operation S390 is performed by the controller 120. As shown in FIG. 3C, if the determination result at operation S395 is that the charging time is reached, operation S365 is performed to determine whether or not all the charging combinations have been completed. If the determination result in operation S395 is that the charging time is not reached, the process returns to operation S385 to continue to detect and determine whether the sum of the stored auxiliary current value and the total charging current value is greater than the current threshold.

For example, assuming that the current values in the charging system 100 are as shown in Table 3, the current threshold is 12 amperes, and one of the charging combinations according to Table 3 and the main charging power source for each charging schedule is shown in Table 4 as below:

TABLE 3

| charging system100 | | current value(amperes) |
|---|---|---|
| charging power source | P1 | 2 |
| | P2 | 1 |
| | P3 | 1 |
| | P4 | 0.5 |
| auxiliary power source | PAUX | 10 |

TABLE 4

| charging schedule | charging power source | main charging power source |
|---|---|---|
| first charging combination | charging power sourceP1 | charging power source P1 |
| second charging combination | charging power sourceP2 and charging power sourceP3 | charging power source P2 |
| third charging combination | charging power sourceP3 and charging power sourceP2 | charging power source P3 |
| fourth charging combination | charging power sourceP4 and charging power sourceP2 | charging power source P4 |

In operation S350, the auxiliary power source PAUX and the charging power source P1 are charged according to the first charging combination in Table 4. If the determination result in operation S355 is that the sum of the auxiliary current value and the total charging current value is greater than the current threshold value, the determination result in operation S360 is the arrival time, and the determination result in operation S365 is not all the charging combinations are completed, return to operation S350 to charge the auxiliary power source PAUX, the charging power source P2, and the charging power source P3 according to the second charging combination. When all the first charging combination, the second charging combination, the third charging combination, and the charging combination are completed, it is determined in operation S365 that all the charging combinations have been completed, and the process returns to operation S310 to detect the charging current value of each of the charging power sources P1 to PN.

For another example, assuming that the current values in the charging system 100 are as shown in Table 5, the current threshold is 12 amperes, and one of the charging schedule according to Table 5 and the main charging power source for each charging schedule is shown in Table 6 as below:

TABLE 5

| charging system100 | | current value(amperes) |
| --- | --- | --- |
| charging power source | P1 | 5 |
| | P2 | 3.5 |
| | P3 | 3 |
| | P4 | 2 |
| auxiliary power source | PAUX | 0.5 |

TABLE 6

| charging schedule | charging power source | main charging power source |
| --- | --- | --- |
| First charging combination | charging power source P1, charging power source P2, and charging power source P3 | charging power source P1 |
| second charging combination | charging power source P2, charging power source P3, and charging power source P1 | charging power source P2 |
| third charging combination | charging power source P3, charging power source P1, and charging power source P2 | charging power source P3 |
| fourth charging combination | charging power sourceP4, charging power source P1, and charging power source P2 | charging power source P4 |

In operation S350, the auxiliary power source PAUX, the charging power source P1, the charging power source P2, and the charging power source P3 are charged according to the first charging combination in Table 6. If the demand current of the auxiliary power source PAUX raises when the charge is charged according to the first charging combination, the auxiliary current detecting device 140 detects that the auxiliary current value is increased from 0.5 amps to 8 amps in operation S355, and the determination result of operation S355 is that the sum of the auxiliary current value and the total charging current value is greater than the current threshold value, and therefore, operation S370 is performed.

If the minimum charging combination of the first charging combination is a combination containing only the main charging power source. In operation S370, it is determined that the auxiliary switching element and/or the charging switching element that are turned on are not the minimum charging combination, and the operation S375 is performed. In operation S375, the charging switching element other than the main charging power source is turned off, that is, the charging of the charging power source P2 is stopped. After stopping the charging of the charging power source P2, operation S355 is performed, and it is determined whether or not the sum of the auxiliary current value and the total charging current value is greater than the current threshold.

In operation S355, since the sum of the detected total charging current value and the auxiliary current value is the sum of the current values of the charging power source P1, the charging power source P3, and the auxiliary power source PAUX, that is, 16 amps, then the determination result of operation S355 is that the sum of the auxiliary current value and the total charging current value is greater than the current threshold value, and therefore, operation S370 is performed. Since the minimum charging combination of the first charging combination is a combination including only the main charging power source, the determination result of operation S370 is that the auxiliary switching element and/or the charging switching element that are turned on are not the minimum charging combination, and therefore the operation S375 is performed. In operation S375, the charging switching element other than the main charging power source is turned off, that is, the charging of the charging power source P3 is stopped. After stopping the charging of the charging power source P2, operation S355 is performed, and it is determined whether the sum of the auxiliary current value and the total charging current value is greater than the current threshold or not.

In operation S355, since the sum of the detected total charging current value and the auxiliary current value is 13 amps of the sum of the current values of the charging power source P1 and the auxiliary power source PAUX, the determination result of operation S355 is that the sum of the auxiliary current value and the total charging current value is larger than the current threshold value, and therefore, operation S370 is performed. Since the minimum charging combination of the first charging combination is a combination including only the main charging power source, the determination result of operation S370 is that the auxiliary switching element and/or the charging switching element that are turned on are the minimum charging combination, and therefore the operation S380 is performed.

In operation S380, the auxiliary current value is stored and the auxiliary switching element is turned off, that is, the detected auxiliary current value (8 amps) is stored, and the auxiliary power source PAUX is stopped. At this time, the charging system P1 charges only the charging power source P1 simultaneously. In operation S385, it is detected and determined whether the sum of the stored auxiliary current value and the total charging current value is greater than the current threshold value or not. Since the stored auxiliary current value is 8 amperes and the detected total charging current value is 5 amps, the determination of operation S385 is that the sum of the stored auxiliary current value and the total charging current value is greater than the current threshold value, and therefore, operation S395 is performed. That is, the charging system 100 continues to charge only the charging power source P1 until the charging time is reached.

However, when the operation S385 is executed, the current demand of the charging power source P1 is reduced from 5 amps to 2 amperes due to the charging of the charging power source P1, and the stored auxiliary current value is 8 amps, and the total charging current value Is 2 amperes, and the determination result at operation S385 is that the sum of the stored auxiliary current value and the total charging current value is not greater than the current threshold value, and therefore, operation S390 is performed. In operation S390, the auxiliary switching element RAUX is turned on. That is, the charging system 100 restarts charging the auxiliary power source PAUX and charges the charging power source P1 and the auxiliary power source PAUX until the charging time is reached.

After the first charging combination has been performed, the second charging combination is then performed. And after all the charging combinations have been completed, the process returns to operation S310 to detect the charging current value of each of the charging power sources P1 to PN again.

In yet another example, assuming that the current values in the charging system 100 are as shown in Table 7, the current threshold is 12 amperes, and one of the charging schedule according to Table 7 and the main charging power source of each charging combination is shown in Table 8:

TABLE 7

| charging system100 | | current value(amperes) |
|---|---|---|
| charging power source | P1 | 5 |
| | P2 | 1 |
| | P3 | 1 |
| | P4 | 1 |
| auxiliary power source | PAUX | 8 |

TABLE 8

| charging schedule | charging power source | main charging power source |
|---|---|---|
| first charging combination | charging power source P1 | charging power source P1 |
| second charging combination | charging power source P2, charging power source P3, and charging power source P4 | charging power source P2 |
| third charging combination | charging power source P3, charging power source P4, and charging power source P2 | charging power source P3 |
| fourth charging combination | charging power source P4, charging power source P2, and charging power source P3 | charging power source P4 |

In operation S350, the auxiliary power source PAUX and the charging power source P1 are charged according to the first charging combination in Table 8. Although the demand current of the charging power source P1 is smaller than the current threshold value, since the sum of the demand current of the auxiliary power source PAUX and the demand current of the charging power source P1 is greater than the current threshold value, the total charging current value detected in operation S355 is equal to the sum of the auxiliary current value and the current values of the charging power source P1 and the auxiliary power source PAUX, that is, 13 amps, the determination result of operation S355 is that the sum of the auxiliary current value and the total charging current value is larger than the current threshold value. Since the minimum charging combination of the first charging combination is a combination including only the main charging power source, the determination result of operation S370 is that the auxiliary switching element and/or the charging switching element that are turned on are the minimum charging combination, so that the operation S380.

In operation S380, the auxiliary current value is stored and the auxiliary switching element is turned off, that is, the detected auxiliary current value (8 amps) is stored, and the auxiliary power source PAUX is stopped. At this time, the charging system P1 charges only the charging power source P1 simultaneously. In operation S385, it is detected and determined whether the sum of the stored auxiliary current value and the total charging current value is greater than the current threshold value or not. Since the stored auxiliary current value is 8 amperes and the detected total charging current value is 5 amps, the determination of operation S385 is that the sum of the stored auxiliary current value and the total charging current value is greater than the current threshold value, and therefore, operation S395 is performed. That is, the charging system 100 continues to charge only the charging power source P1 until the charging time is reached.

After the execution of the first charging combination, operation S365 is performed to determine whether or not all the charging combinations have been completed. Since all the charging combinations have not been completed, the determination result at operation S365 is that all of the charging combinations have not been completed, and the process returns to operation S350 to connect the auxiliary power source PAUX, the charging power source P2, the charging power source P3 and the charging power source according to the second charging combination in Table 8 P4 to charge. And after all the charging combinations have been completed, the process returns to operation S310 to detect the charging current value of each of the charging power sources P1 to PN again.

The current threshold, the charging current value, the auxiliary current value, the charging combination, etc. described above are merely for illustrative purposes only, and the present disclosure are not limited thereto.

In some embodiments of the present disclosure, the controller 120 may be a server, a circuit, a central processing unit, a central processing unit, a central processing unit, a central processing unit, a central processing unit, a central processing unit, CPU), a microprocessor (MCU), or other device with equivalent functionality.

In some embodiments of the present disclosure, the charging current detecting device 130 and the auxiliary current detecting device 140 may be devices or circuits having current detection or other equivalent functions. In some embodiments of the present disclosure, the AC/DC converter 110 may be a current conversion circuit between an alternating current and a direct current or other device or circuit having an equivalent function. In some embodiments of the present disclosure, the charging surge protecting device 150 and the auxiliary surge protecting device 160 may be devices or circuits having surge current protection or other equivalent functions.

In some embodiments of the present disclosure, the charging driver circuits D1 to DN and the auxiliary driver circuit DAUX may be circuits having a function of transmitting and receiving information, controlling the functions of the charging switching elements R1 to RN and/or the auxiliary switching element RAUX, or other devices or circuits with the same function. In some embodiments of the present disclosure, the charging switching elements R1 to RN and the auxiliary switching element RAUX may be elements having functions such as turning on or off circuits or other devices or elements having equivalent functions.

According to the embodiment of the present disclosure, it is understood that the embodiment of the present disclosure is to provide a charging method and a charging system, and in particular, a charging method and a charging system for allocating power between the charging power source and the auxiliary power source, in order to effectively allocate power between the charging and auxiliary power to ensure that the charging power source may charge the digital devices while maintaining the flexibility of the auxiliary power source.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A charging method, comprising:
   charging an auxiliary power source and at least one charging power source simultaneously, wherein a power demand of the auxiliary power source is a first consideration, and a power demand of the at least one charging power source is a second consideration, wherein charging the auxiliary power source and the at least one charging power source simultaneously comprises:
      detecting a charging current value of each of the at least one charging power source;
      detecting an auxiliary current value for the auxiliary power source;
      setting a charging schedule comprising a plurality of charging combinations, wherein each of the charging combinations comprises at least one of the at least one charging power source, and a sum of the charging current value of the at least one of the at least one charging power source and the auxiliary current value is not greater than a current threshold value; and
      charging the auxiliary power source and the at least one of the at least one charging power source according to the charging schedule;
   detecting the auxiliary current value of the auxiliary power source and a total charging current value of the at least one charging power source;
   if a sum of the auxiliary current value and the total charging current value is not greater than the current threshold value, determining whether a charging time is reached or not, if the charging time is not reached, continuing to detect and determine whether the sum of the auxiliary current value and the total charging current value is greater than the current threshold or not; and
   stopping charging the auxiliary power source when the sum of the auxiliary current value and the total charging current value is greater than the current threshold value.

2. The charging method of claim 1, comprising:
   storing the auxiliary current value detected before stopping charging the auxiliary power source; and
   restarting to charge the auxiliary power source when the auxiliary power source is not under charging and if the sum of the auxiliary current value which is stored and the total charging current value is not greater than the current threshold.

3. The charging method of claim 1, wherein stopping charging the auxiliary power source comprises:
   turning off an auxiliary switching element which is coupled to the auxiliary power source.

4. The charging method of claim 1, wherein before an operation of stopping charging the auxiliary power source comprises:
   stopping charging at least one of the at least one charging power source other than a main charging power source.

5. The charging method of claim 4, wherein stopping charging the at least one of the at least one charging power source other than the main charging power source comprises:
   turning off a charging switching element corresponding to the at least one of the at least one charging power source.

6. The charging method of claim 1, wherein before an operation of stopping charging the auxiliary power source comprises:
   stopping charging each of the at least one charging power source other than a main charging power source.

7. The charging method of claim 1, wherein setting the charging schedule comprises:
   calculating a charging current threshold by subtracting the auxiliary current value from the current threshold, and a sum of the charging current of the at least one of the at least one charging power source comprised in the charging combination is not greater than the charging current threshold.

8. The charging method of claim 7, wherein the at least one charging power source comprises a plurality of charging power sources, wherein the charging power sources comprises a first charging power source, a second charging power source, and a third charging power source, and the charging combinations comprise a first charging combination, a second charging combination, and a third charging combination, wherein setting the charging schedule comprises:
   selecting the second charging power source or the third charging power source according to the charging current threshold to form the first charging combination, wherein the first charging combination comprises at least the first charging power source, and the first charging power source is a main charging power source of the first charging combination;
   selecting the first charging power source or the third charging power source according to the charging current threshold to form the second charging combination, wherein the second charging combination comprises at least the second charging power source, and the second charging power source is a main charging power source of the second charging combination; and selecting the first charging power source or the second charging power source according to the charging current threshold to form the third charging combination, wherein the third charging combination comprises at least the third charging power source, and the third charging power source is a main charging power source of the third charging combination.

9. A charging system, comprising:

an auxiliary current detecting device configured to detect an auxiliary current value when an auxiliary power source is under charging, wherein a power demand of the auxiliary power source is a first consideration;

a charging current detecting device configured to detect a total charging current value when at least one charging power source is under charging, wherein a power demand of the at least one charging power source is a second consideration; and a controller connected to the auxiliary current detecting device and the charging current detecting device, and the controller is configured to determine whether a sum of the auxiliary current value and the total charging current value is greater than a current threshold value or not, wherein if the sum of the auxiliary current value and the total charging current value is greater than the current threshold value, the controller stops charging the auxiliary power source;

wherein the charging current detecting device is configured to detect a charging current value of each of the at least one charging power source, wherein the controller sets a charging schedule comprising a plurality of charging combinations, wherein each of the charging combination comprises at least one of the at least one charging power source, and the sum of the charging current value of the at least one of the at least one charging power source and the auxiliary current value is not greater than the current threshold value, and the controller charges the auxiliary power source and the at least one of the at least one charging power source according to the charging schedule;

wherein if the sum of the auxiliary current value and the total charging current value is not greater than the current threshold value, the controller determines whether a charging time is reached or not, if the charging time is not reached, the controller continues to detect and determine whether the sum of the auxiliary current value and the total charging current value is greater than the current threshold or not.

10. The charging system of claim 9, wherein when a charging of the auxiliary power source is stopped, the controller stores the auxiliary current value detected before stopping charging the auxiliary power source, and if a sum of the total charging current value and the auxiliary current value which is stored by the controller is not greater than the current threshold, the controller restarts charging the auxiliary power source.

11. The charging system of claim 10, further comprising:

an auxiliary switching element turning on or off according to an auxiliary control signal transmitted by the controller to start or stop charging the auxiliary power source; and at least one charging switching element turning on or off according to at least one charging control signal in correspondence transmitted by the controller to start or stop charging the at least one charging power source in correspondence.

12. The charging system of claim 11, further comprising:

an auxiliary power source driver configured to receive the auxiliary control signal and configured to control the auxiliary switching element according to the auxiliary control signal; and at least one charging power source driver configured to receive the at least one charging control signal in correspondence, wherein the at least one charging power source driver controls the at least one charging switching element in correspondence according to the at least one charging control signal.

13. The charging system of claim 9, wherein before the controller stops charging the auxiliary power source, the controller stops charging at least one of the at least one charging power source other than a main charging power source.

14. The charging system of claim 9, wherein before the controller stops charging the auxiliary power source, the controller stops charging each of the at least one charging power source other than a main charging power.

15. The charging system of claim 9, wherein the controller further subtracts the auxiliary current value from the current threshold to calculate a charging current threshold, and the sum of the charging current of the at least one of the at least one charging power source comprised in the charging combinations is not greater than the charging current threshold.

16. The charging system of claim 15, wherein the at least one charging power source comprises a plurality of charging power sources, wherein the charging power sources comprises a first charging power source, a second charging power source and a third charging power source, and the charging combinations comprise a first charging combination, a second charging combination, and a third charging combination;

wherein the controller further determines that the first charging combination comprises at least the first charging power source, and that the first charging power source is a main charging power source of the first charging combination, and the controller selects the second charging power source or the third charging power source according to the charging current threshold to form the first charging combination, wherein the controller determines that the second charging combination comprises at least the second charging power source, and that the second charging power source is a main charging power source of the second charging combination, and the controller selects the first charging power source or the third charging power source according to the charging current threshold to form the second charging combination, wherein the controller determines that the third charging combination comprises at least the third charging power source, and that the third charging power source is a main charging power source of the third charging combination, and the controller selects the first charging power source or the second charging power source according to the charging current threshold value to form the third charging combination.

* * * * *